US010920787B2

(12) United States Patent
Sakurada et al.

(10) Patent No.: US 10,920,787 B2
(45) Date of Patent: Feb. 16, 2021

(54) BLOWER

(71) Applicant: Nidec Corporation, Kyoto (JP)

(72) Inventors: Kunio Sakurada, Kyoto (JP); Hiroshi Morishita, Kyoto (JP); Akinobu Sumiji, Kyoto (JP); Hirotaka Tamekuni, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 105 days.

(21) Appl. No.: 16/157,141

(22) Filed: Oct. 11, 2018

(65) Prior Publication Data

US 2019/0195232 A1 Jun. 27, 2019

(30) Foreign Application Priority Data

Dec. 22, 2017 (JP) .................................. 2017-246694

(51) Int. Cl.
| | |
|---|---|
| *F04D 29/32* | (2006.01) |
| *F04D 19/00* | (2006.01) |
| *F04D 25/06* | (2006.01) |
| *F04D 29/08* | (2006.01) |
| *H02K 7/08* | (2006.01) |
| *H02K 7/14* | (2006.01) |
| *F04D 29/52* | (2006.01) |
| *F04D 29/00* | (2006.01) |

(Continued)

(52) U.S. Cl.
CPC ......... *F04D 29/329* (2013.01); *F04D 19/002* (2013.01); *F04D 25/0606* (2013.01); *F04D 25/0613* (2013.01); *F04D 29/083* (2013.01); *F04D 29/522* (2013.01); *H02K 7/08* (2013.01); *H02K 7/14* (2013.01); *F04D 25/08* (2013.01); *F04D 29/002* (2013.01); *F16C 17/10* (2013.01); *F16C 32/0412* (2013.01); *F16C 32/0614* (2013.01); *F16C 2360/46* (2013.01); *H02K 5/1675* (2013.01); *H02K 7/09* (2013.01)

(58) Field of Classification Search
CPC ............... F04D 19/002; F04D 25/0606; F04D 25/0613; F04D 25/08; F04D 29/325; F04D 29/329; F04D 29/522; F04D 29/083; F16C 32/0614; H02K 5/10
USPC ................ 415/174.5; 417/354, 423.7, 423.9, 417/423.11, 423.12, 423.14, 424.1
See application file for complete search history.

(56) References Cited

U.S. PATENT DOCUMENTS 4,959,571 A * 9/1990 Yasumoto ........... F04D 25/0613
310/63
6,158,985 A * 12/2000 Watanabe ........... F04D 25/0613
417/423.14

(Continued)

FOREIGN PATENT DOCUMENTS

| JP | 06-229394 A | 8/1994 |
|---|---|---|
| JP | 2001-107893 A | 4/2001 |
| JP | 2011-047387 A | 3/2011 |

*Primary Examiner* — Alexander B Comley
(74) *Attorney, Agent, or Firm* — Keating & Bennett

(57) ABSTRACT

A blower includes an impeller that is rotatable about a central axis extending in a vertical direction, a motor that rotates the impeller, and a base portion on which the motor is mounted. The impeller includes a cup portion that covers the motor, and blades extending radially outward from the cup portion and arranged in a circumferential direction. A gap is provided between the cup portion and the base portion such that the gap becomes narrower in an outward direction with increasing distance from an interior of the cup portion.

9 Claims, 11 Drawing Sheets

(51) Int. Cl.
    *F04D 25/08*     (2006.01)
    *F16C 32/06*     (2006.01)
    *H02K 7/09*     (2006.01)
    *H02K 5/167*     (2006.01)
    *F16C 32/04*     (2006.01)
    *F16C 17/10*     (2006.01)

(56) References Cited

U.S. PATENT DOCUMENTS

| | | | |
|---|---|---|---|
| 6,332,758 B1 * | 12/2001 | Tang | F04D 25/0606 |
| | | | 417/354 |
| 6,551,074 B2 | 4/2003 | Kudo et al. | |
| 8,246,329 B2 * | 8/2012 | Li | F04D 25/0613 |
| | | | 310/63 |
| 8,678,785 B2 | 3/2014 | Nogami et al. | |
| 9,033,680 B2 * | 5/2015 | Kudo | F04D 25/0646 |
| | | | 417/354 |
| 9,057,380 B2 * | 6/2015 | Lin | F04D 25/062 |
| 2011/0027075 A1 * | 2/2011 | Nogami | F04D 25/0613 |
| | | | 415/182.1 |

* cited by examiner

BLOWER

CROSS REFERENCE TO RELATED APPLICATIONS

This application claims the benefit of priority to Japanese Patent Application No. 2017-246694 filed on Dec. 22, 2017. The entire contents of this application are hereby incorporated herein by reference.

BACKGROUND OF THE INVENTION

1. Field of the Invention

The present invention relates to a blower.

2. Description of the Related Art

A known blower is described in JP-A 2000-110773. This blower includes an impeller arranged to rotate about a central axis extending in a vertical direction, a motor arranged to rotate the impeller, and a motor support on which the motor is mounted. The impeller includes a cup member arranged to cover the motor, and blades. The blades are arranged to extend radially outward from a tubular blade-attached wall portion of the cup member, and are arranged in a circumferential direction.

A tubular outer wall portion is arranged to project axially upward at an outer circumferential portion of the motor support. A gap is defined between the outer wall portion and the blade-attached wall portion to prevent a contact between the cup member and the motor support while the impeller is rotating. In addition, a shoulder portion is defined in each of an upper end portion of the outer wall portion and a lower end portion of the blade-attached wall portion to cause the gap to have a labyrinth structure. This contributes to preventing moisture from intruding from an outside space into a space inside of the cup member, and thus preventing a malfunction of the motor.

However, the blower described in JP-A 2000-110773 has a problem of complexity in structure because of the need to define the labyrinth structure. In addition, moisture gathered in the gap could not be easily discharged to the outside space, resulting in a problem of reduced waterproof performance.

SUMMARY OF THE INVENTION

Preferred embodiments of the present invention provide blowers that are each able to achieve improved waterproof performance with a simple structure.

A blower according to a preferred embodiment of the present invention includes an impeller that is rotatable about a central axis extending in a vertical direction; a motor that rotates the impeller; and a base portion on which the motor is mounted. The impeller includes a cup portion that covers the motor, and a plurality of blades extending radially outward from the cup portion and arranged in a circumferential direction. A gap is provided between the cup portion and the base portion such that the gap becomes narrower in an outward direction with increasing distance from an interior of the cup portion.

The blowers according to preferred embodiments of the present invention achieve improved waterproof performance with a simple structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. It is assumed herein that a direction parallel or substantially parallel to a central axis C of a blower is referred to as an axial direction, that directions perpendicular or substantially perpendicular to the central axis C of the blower 1 are each referred to as a radial direction, and that a direction along a circular arc centered on the central axis C of the blower 1 is referred to as a circumferential direction. Similarly, an axial direction, a radial direction, and a circumferential direction with respect to an impeller 10 installed in the blower 1 are assumed to correspond to the axial direction, the radial direction, and the circumferential direction, respectively, with respect to the blower 1. It is also assumed herein that the axial direction is a vertical direction, and that a side on which a motor 50 is arranged with respect to the impeller 10 is defined as a lower side. The shape of each member or portion and relative positions of different members or portions will be described based on the above assumptions. It should be noted, however, that the above definition of the vertical direction and the upper and lower sides is made simply for the sake of convenience in description, and is not meant to restrict actual relative positions or actual directions.

First Preferred Embodiment

1. Structure of Blower

Figure 1:
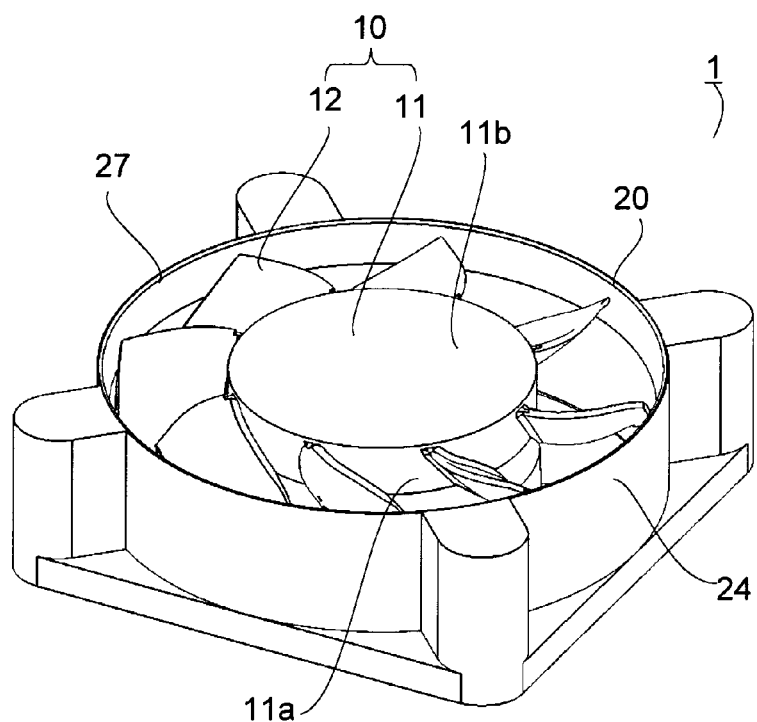
FIG. 1 is a perspective view of a blower according to a first preferred embodiment of the present invention.
Figure 2:
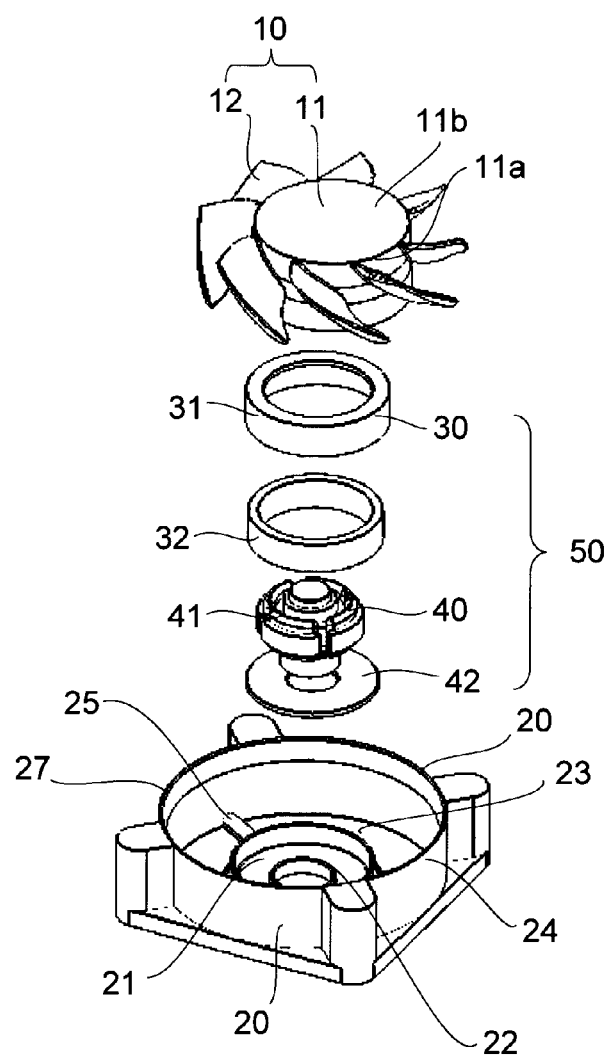
FIG. 2 is an exploded perspective view of the blower according to the first preferred embodiment of the present invention.
Figure 3:
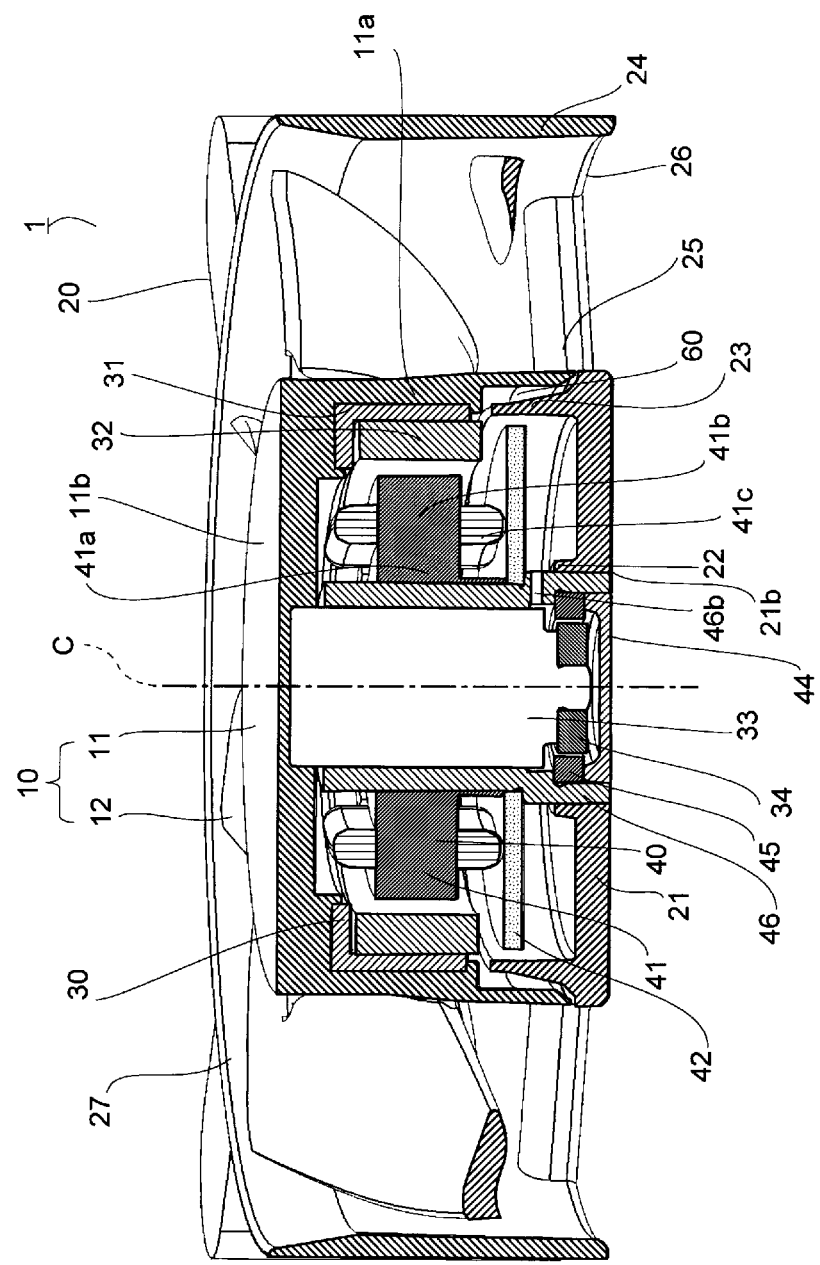
FIG. 3 is a perspective sectional view of the blower according to the first preferred embodiment of the present invention.

A blower 1 according to a preferred embodiment of the present invention will be described below. FIGS. 1 and 2 are a perspective view and an exploded perspective view, respectively, of the blower 1 according to a first preferred embodiment of the present invention. FIG. 3 is a perspective sectional view of the blower 1. Note that, although the blower 1 according to the present preferred embodiment is assumed to be an axial fan by way of example, preferred embodiments of the present invention are also applicable to centrifugal fans.

The blower 1 includes a housing 20, an impeller 10, and a motor 50. The impeller 10 and the motor 50 are housed in the housing 20. The motor 50 is arranged below the impeller 10 to rotate the impeller 10 about a central axis C. Note that the motor 50 may be either an outer-rotor motor or an inner-rotor motor.

2. Structure of Motor

The motor 50 includes a rotating portion 30 and a stationary portion 40. The stationary portion 40 includes a stator 41, a circuit board 42, a sleeve 46, a cap 44, and a third magnet 45.

The stator 41 includes a core back 41a, teeth 41b, and coils 41c. The core back 41a is arranged in an annular shape around the central axis C, and is defined by laminated steel sheets. The teeth 41b are arranged to extend radially outward from the core back 41a, and are arranged at regular intervals in the circumferential direction. Each coil 41c is defined by a conducting wire (not shown) wound around a separate one of the teeth 41b a plurality of times with an insulating member (not shown) therebetween. The conducting wire is electrically connected to the circuit board 42, which is annular.

The sleeve 46 is tubular, and is arranged to be open at both upper and lower ends. Each of the annular core back 41a and the circuit board 42 is externally fitted to and fixed to the sleeve 46. In addition, the third magnet 45, which is annular, is internally fitted and fixed to a lower portion of an inner circumferential surface of the sleeve 46. The sleeve 46 includes an air supply hole 46b arranged to pass therethrough in a radial direction on the axially upper side of the third magnet 45. The lower end of the sleeve 46 is closed with the cap 44.

The rotating portion 30 includes a rotor holder 31, a first magnet 32, a shaft 33, and a second magnet 34. The shaft 33 is a columnar metal member arranged to define a rotating shaft extending along the central axis C, and is inserted in the sleeve 46.

The second magnet 34, which is annular, is attached to a lower end portion of the shaft 33, and the second magnet 34 and the third magnet 45 are arranged radially opposite to each other with a predetermined distance therebetween. Magnetic attraction acts between the second magnet 34 and the third magnet 45. The shaft 33 is thus kept floating a predetermined distance above an upper surface of the cap 44.

In addition, a minute gap is defined between an outer circumferential surface of the shaft 33 and the inner circumferential surface of the sleeve 46, and air that enters through the air supply hole 46b and air that enters through a gap between the sleeve 46 and a lower surface of a top portion 11b of a cup portion 11 flow through the minute gap. Thus, an air dynamic pressure bearing is defined between the outer circumferential surface of the shaft 33 and the inner circumferential surface of the sleeve 46, and the shaft 33 is rotatably supported through the air dynamic pressure bearing.

The rotor holder 31 is in the shape of a covered cylinder, and the first magnet 32 is fixed to an inner circumferential surface of the rotor holder 31. The first magnet 32 is arranged radially outside of the coils 41c, and a torque is generated between the teeth 41b and the first magnet 32 while the motor 50 is running. The rotor holder 31 is fixed to an inside of the cup portion 11, which will be described below.

3. Structure of Impeller

The impeller 10 includes the cup portion 11 and blades 12. The cup portion 11 and the blades 12 are molded in one piece of a resin.

The cup portion 11 includes a cylindrical barrel portion 11a and the top portion 11b, which is arranged to cover an upper side of the barrel portion 11a. The barrel portion 11a is tubular, extending in the axial direction, and is arranged to be open at a lower end. The rotor holder 31 is fixed to the inside of the cup portion 11.

A center (on the central axis C) of the top portion 11b is fixed to an upper end portion of the shaft 33. The impeller 10 and the shaft 33 are thus joined to each other, so that the impeller 10 is supported through the sleeve 46 to be rotatable about the central axis C.

The blades 12 are arranged to extend radially outward from the barrel portion 11a of the cup portion 11. The blades 12 are arranged at regular intervals in the circumferential direction.

4. Structure of Housing

Figure 4:
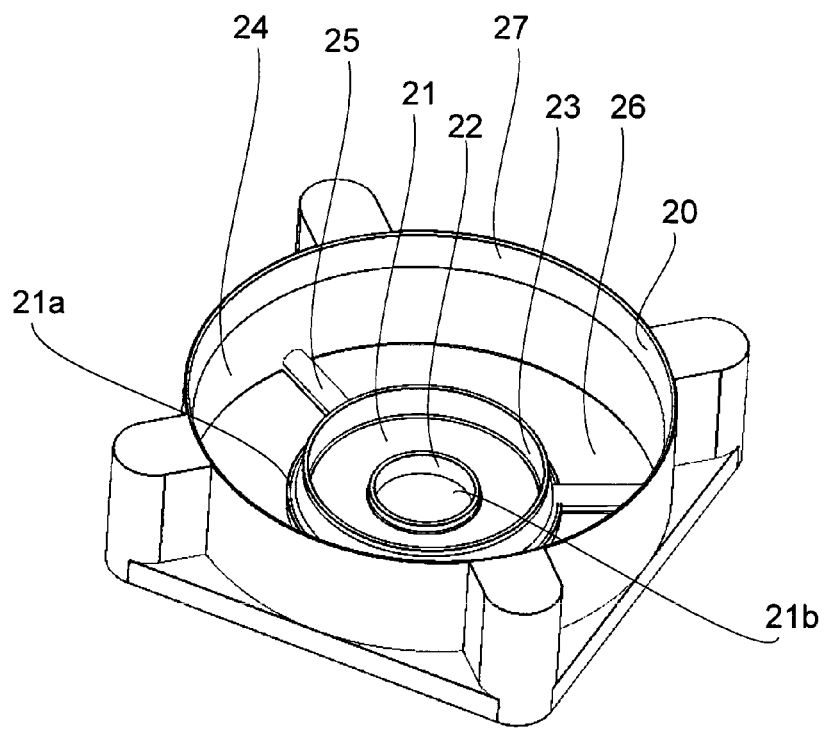
FIG. 4 is a perspective view of a housing of the blower according to the first preferred embodiment of the present invention.

FIG. 4 is a perspective view of the housing 20. The housing 20 includes a base portion 21, an outer circumferential wall 24, and support portions 25, and is molded in one piece of a resin. Note that the housing 20 may not necessarily be molded in one piece of a resin. The housing 20 may alternatively be molded in one piece of a metal material (for example, aluminum).

The outer circumferential wall 24 is cylindrical, and is arranged radially outward of radially outer ends of the blades 12. The outer circumferential wall 24 is arranged to be open and define an air outlet 27 at an upper end.

The base portion 21 is in the shape of a disk, extending perpendicularly to the axial direction, and includes an insert hole 21b in a center (on the central axis C) thereof. The base portion 21 includes a projection portion 22 and a wall portion 23.

The projection portion 22 is arranged in an annular shape along the insert hole 21b, and is arranged to project axially upward from an upper surface of the base portion 21. The sleeve 46 is inserted in the insert hole 21b, and the sleeve 46 is fixed to the base portion 21. The motor 50 is thus mounted on the base portion 21.

The wall portion 23 is arranged to extend axially upward from the upper surface of the base portion 21 to assume a cylindrical shape. The wall portion 23 is arranged radially inward of the barrel portion 11a of the cup portion 11, and the stator 41 and the circuit board 42 are arranged radially inward of the wall portion 23. A gap 60, which will be described below, is defined between the wall portion 23 and the cup portion 11 to prevent a contact between the base portion 21 and the cup portion 11 while the impeller 10 is rotating.

Each support portion 25 is arranged to extend radially outward from the base portion 21 to join the base portion 21 and a lower end portion of the outer circumferential wall 24 to each other. The support portions 25 are arranged at three positions in the circumferential direction. An air inlet 26 is defined in a space between adjacent ones of the support portions 25. Note, however, that the support portions 25 may not necessarily be arranged at three positions in the circumferential direction. Alternatively, one or more support portions 25 may be arranged at one, two, or more than three positions.

Once the motor 50 is driven, the impeller 10 starts rotating about the central axis C. Thus, air enters into the housing 20 through the air inlet 26, travels axially upward, and is blown out of the housing 20 through the air outlet 27. In the present preferred embodiment, the air travels axially upward from axially below the housing 20 as described above, but this is not essential to the present invention. The shape of the impeller 10 or the rotation direction of the impeller 10 may be changed appropriately to cause air to travel axially downward from axially above the housing 20.

5. Structure of Gap Between Cup Portion and Base Portion

Figure 5:
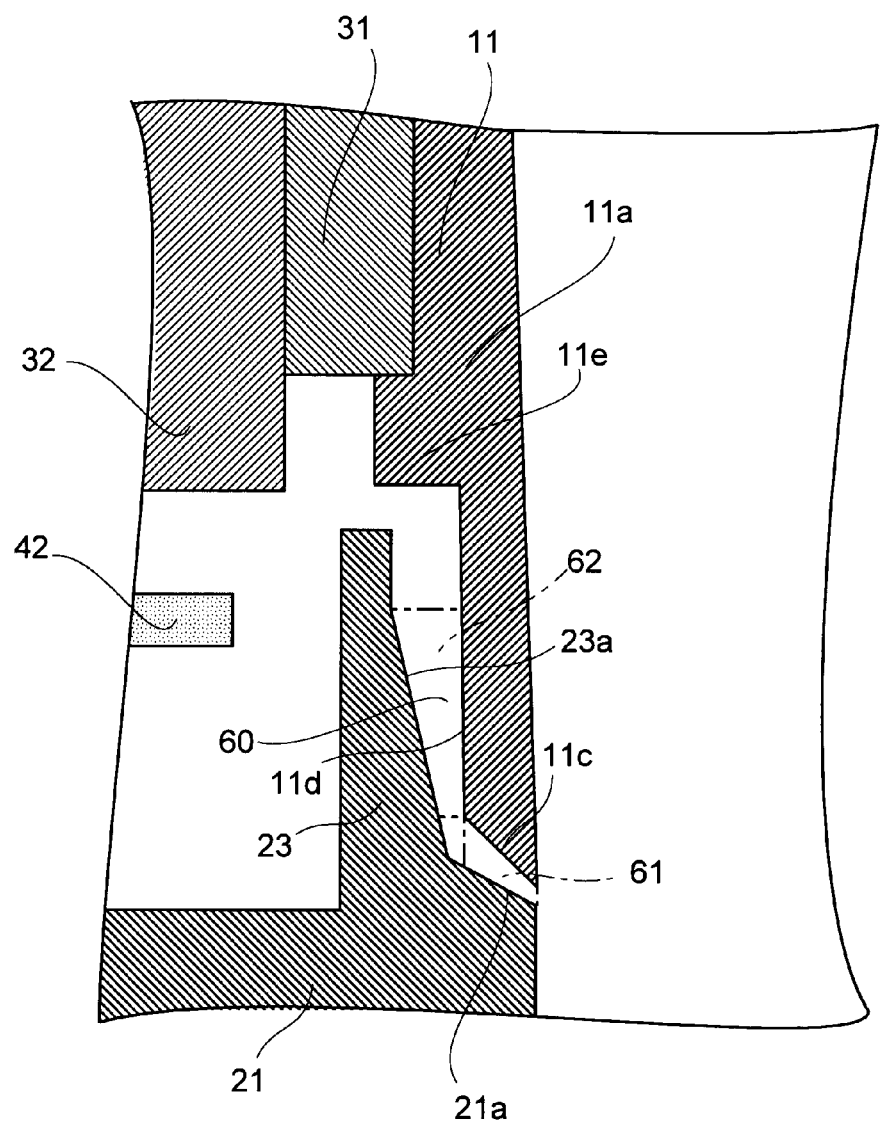
FIG. 5 is a vertical sectional view illustrating a portion of a base portion of the blower according to the first preferred embodiment of the present invention in an enlarged form.

FIG. 5 is a sectional view illustrating a portion of the base portion 21 in an enlarged form, and illustrates the wall portion 23 and its vicinity in an enlarged form. The barrel portion 11a includes a protruding portion 11e arranged to protrude radially inward from an inner circumferential surface 11d thereof. The protruding portion 11e is arranged axially opposite to an upper surface of the wall portion 23. In addition, an upper portion of the protruding portion 11e is arranged to be in contact with a lower end portion of the rotor holder 31. A lower end of each of the rotor holder 31 and the first magnet 32 is arranged axially above an upper end of the wall portion 23.

The gap 60 is defined between the cup portion 11 and the base portion 21. The gap 60 is arranged to become gradually narrower in an outward direction with increasing distance from a deep interior of the cup portion 11.

The gap 60 includes a first region 61 and a second region 62. Each of the first region 61 and the second region 62 is arranged radially outward of the wall portion 23, and the second region 62 is arranged radially inward of the first region 61.

The first region 61 is arranged between a lower end surface 11c of the cup portion 11 and a portion of the base portion 21 which is axially opposed to the lower end surface 11c, and is arranged to gradually decrease in axial width in a radially outward direction. In the present preferred embodiment, the first region is defined between the lower end surface 11c and an upper surface of a peripheral portion 21a of the base portion 21. The peripheral portion 21a is arranged radially outward of the wall portion 23 of the base portion 21.

In the first region 61, the lower end surface 11c is arranged to slant axially downward in the radially outward direction. In addition, the upper surface of the peripheral portion 21a is also arranged to slant axially downward in the radially outward direction. Here, an inclination angle of the upper surface of the peripheral portion 21a with respect to the axial direction is arranged to be greater than an inclination angle of the lower end surface 11c with respect to the axial direction. This causes the first region 61 to gradually decrease in axial width in the radially outward direction.

Due to capillary action, moisture travels toward a narrower area in a flow channel. Therefore, moisture gathered in the first region 61 will flow out radially outward due to capillary action. Accordingly, any moisture that has entered into the first region 61 can be easily discharged out of the cup portion 11, leading to improved waterproof performance of the blower 1 through a simple structure.

In addition, the axial width of the first region 61 gradually increases in a radially inward direction. Accordingly, any moisture that has intruded into the first region 61 from outside the cup portion 11 will be restrained from flowing radially inward by capillary action. This contributes to preventing the moisture from intruding from the first region 61 into the second region 62.

The second region 62 is arranged between radially opposed portions of the base portion 21 and an inner circumferential surface of the cup portion 11, and is arranged to gradually decrease in radial width in an axially downward direction. In the present preferred embodiment, the second region 62 is defined between radially opposed portions of the inner circumferential surface 11d of the barrel portion 11a and an outer circumferential surface 23a of the wall portion 23

In the second region 62, the outer circumferential surface 23a of the wall portion 23 is arranged to slant radially outward in the axially downward direction. In addition, in the second region 62, an inclination angle of the outer circumferential surface 23a with respect to the axial direction is arranged to be greater than an inclination angle of the inner circumferential surface 11d with respect to the axial direction. This causes the second region 62 to gradually decrease in radial width in the axially downward direction.

Moisture gathered in the second region 62 flows axially downward due to capillary action. Accordingly, any moisture that has entered into the second region 62 can be easily discharged out of the cup portion 11, leading to an additional improvement in the waterproof performance of the blower 1.

In addition, the radial width of the second region 62 gradually increases in an axially upward direction. Accordingly, any moisture that has intruded into the second region 62 will be restrained from flowing axially upward by capillary action. This contributes to preventing the moisture from intruding from the second region 62 toward the deep interior of the cup portion 11.

In addition, rotation of the impeller 10 generates a centrifugal force that acts to cause any moisture in the gap 60 to travel radially outward. This makes it easier to discharge any moisture or dust out of the cup portion 11 while the impeller 10 is rotating.

In addition, at least one of portions of an inner surface of the cup portion 11 and the upper surface of the base portion 21 which are opposed to each other with the gap 60 therebetween is arranged to be water-repellent. In the present preferred embodiment, each of the outer circumferential surface 23a, the inner circumferential surface 11d, the lower end surface 11c, and the upper surface of the peripheral portion 21a is arranged to be water-repellent with a water repellent applied thereonto. This makes it easier to discharge any moisture in the gap 60, and contributes to more effectively preventing moisture from intruding into the gap 60.

In addition, a minimum axial width of the gap 60 is arranged to be smaller than a minimum axial width of a gap between the lower end portion of the shaft 33 and a surface axially opposed to the lower end portion of the shaft 33. In the present preferred embodiment, an axial distance between a radially outer end of the lower end surface 11c and the upper surface of the peripheral portion 21a is arranged to be smaller than a minimum axial width of a gap between the lower end portion of the shaft 33 and the upper surface of the cap 44. This contributes to more effectively preventing moisture and dust from intruding into the gap 60 with the reduced axial width of the gap 60.

In addition, because each of the cup portion 11 and the base portion 21 is made of a resin, a seizure due to a contact between the cup portion 11 and the base portion 21 can be prevented while the impeller 10 is rotating. Notice that the likelihood of a seizure can be reduced or eliminated when the cup portion 11 and the base portion 21 are not made of the same metal material or similar metal materials. Therefore, the cup portion 11 and the base portion 21 may not necessarily be made of a resin. For example, one of the cup portion 11 and the base portion 21 and another one of the cup portion 11 and the base portion 21 may be made of a resin and a metal, respectively, and this combination is able to reduce or eliminate the likelihood of a seizure.

Note that each of the portions of the outer circumferential surface 23a and the inner circumferential surface 11d which are opposed to each other with the gap 60 therebetween may alternatively include a plurality of inclined surfaces having different inclination angles with respect to the axial direction. Also note that each of the portions of the outer circumferential surface 23a and the inner circumferential surface 11d which are opposed to each other with the gap 60 therebetween may alternatively be arranged to be curved in a vertical section.

Second Preferred Embodiment

Figure 6:
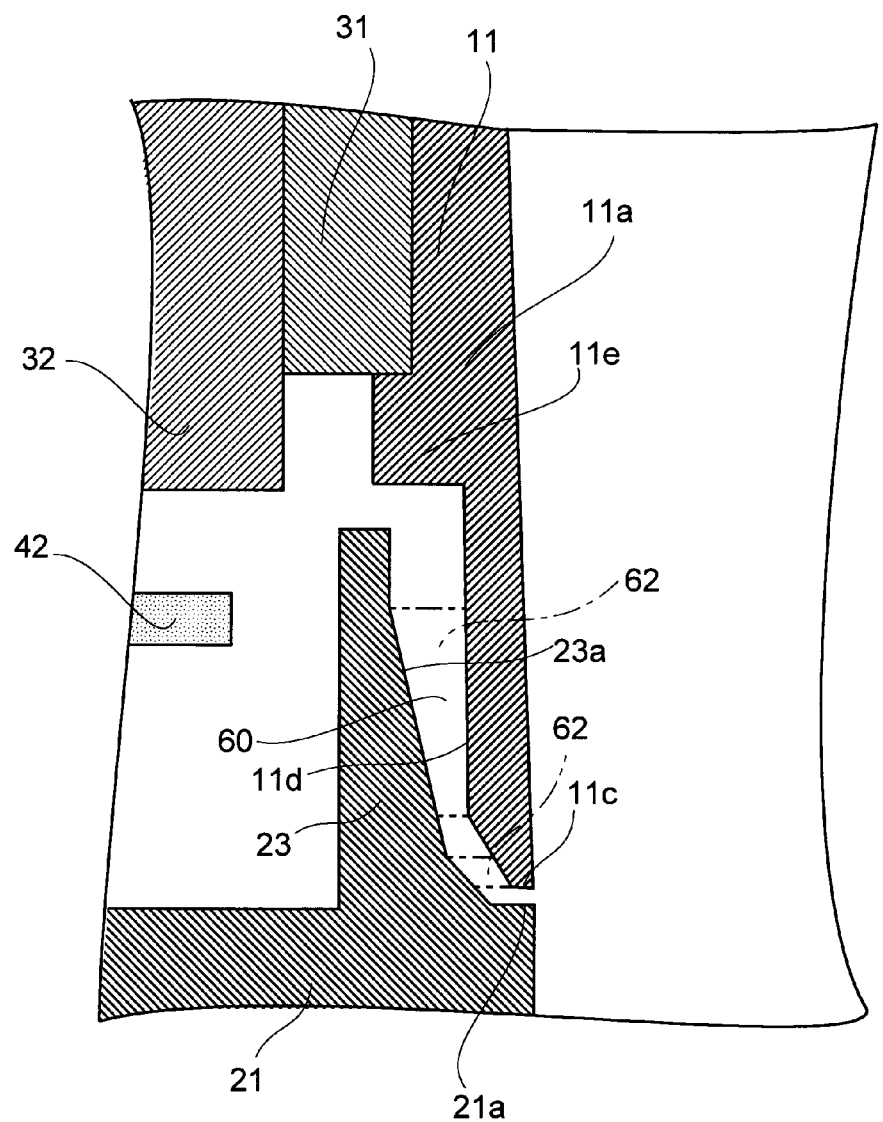
FIG. 6 is a vertical sectional view illustrating a portion of a blower according to a second preferred embodiment of the present invention in an enlarged form.

Next, a second preferred embodiment of the present invention will now be described below. FIG. 6 is a sectional view illustrating a portion of a base portion 21 of a blower 1 according to a second preferred embodiment of the present invention in an enlarged form. For the sake of convenience in description, members or portions that have their equivalents in the above-described first preferred embodiment illustrated in FIGS. 1 to 5 are denoted by the same reference numerals as those of their equivalents in the first preferred embodiment. In the second preferred embodiment, the first region 61 is not provided. The second preferred embodiment is otherwise similar to the first preferred embodiment.

A lower end surface 11c of a cup portion 11 and an upper surface of a peripheral portion 21a of the base portion 21 are arranged to be substantially parallel to each other, and a gap 60 includes no first region 61. In addition, the gap 60 includes a plurality of second regions 62. The present preferred embodiment is also able to achieve beneficial effects similar to those of the first preferred embodiment.

Third Preferred Embodiment

Figure 7:
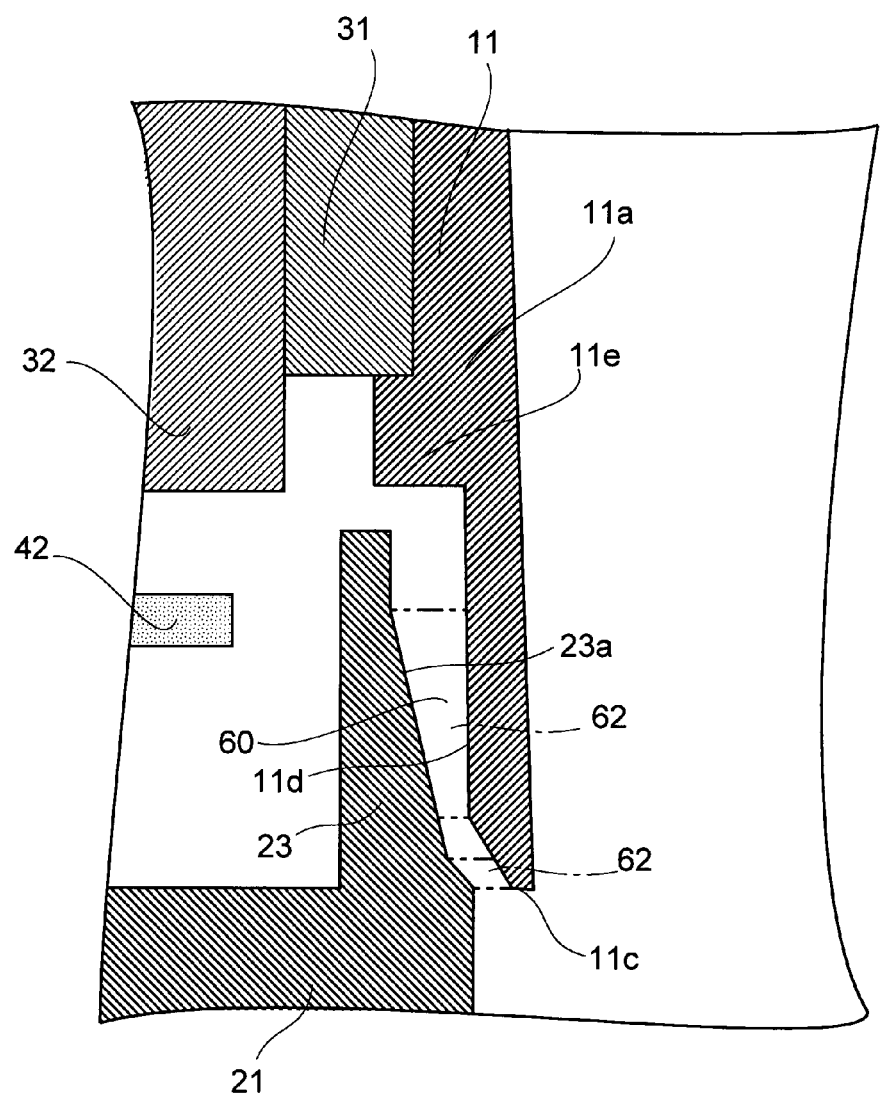
FIG. 7 is a vertical sectional view illustrating a portion of a blower according to a third preferred embodiment of the present invention in an enlarged form.

Next, a third preferred embodiment of the present invention will now be described below. FIG. 7 is a sectional view illustrating a portion of a base portion 21 of a blower 1 according to a third preferred embodiment of the present invention in an enlarged form. For the sake of convenience in description, members or portions that have their equivalents in the above-described first preferred embodiment illustrated in FIGS. 1 to 5 are denoted by the same reference numerals as those of their equivalents in the first preferred embodiment. In the third preferred embodiment, the first region 61 is omitted. The third preferred embodiment is otherwise similar to the first preferred embodiment.

An outer circumferential edge of the base portion 21 is arranged radially inward of a lower end surface 11c of a barrel portion 11a. As a result, the lower end surface 11c of a cup portion 11 is not axially opposed to the base portion 21, and a gap 60 includes no first region 61. The present preferred embodiment is also able to achieve beneficial effects similar to those of the first preferred embodiment.

Fourth Preferred Embodiment

Figure 8:
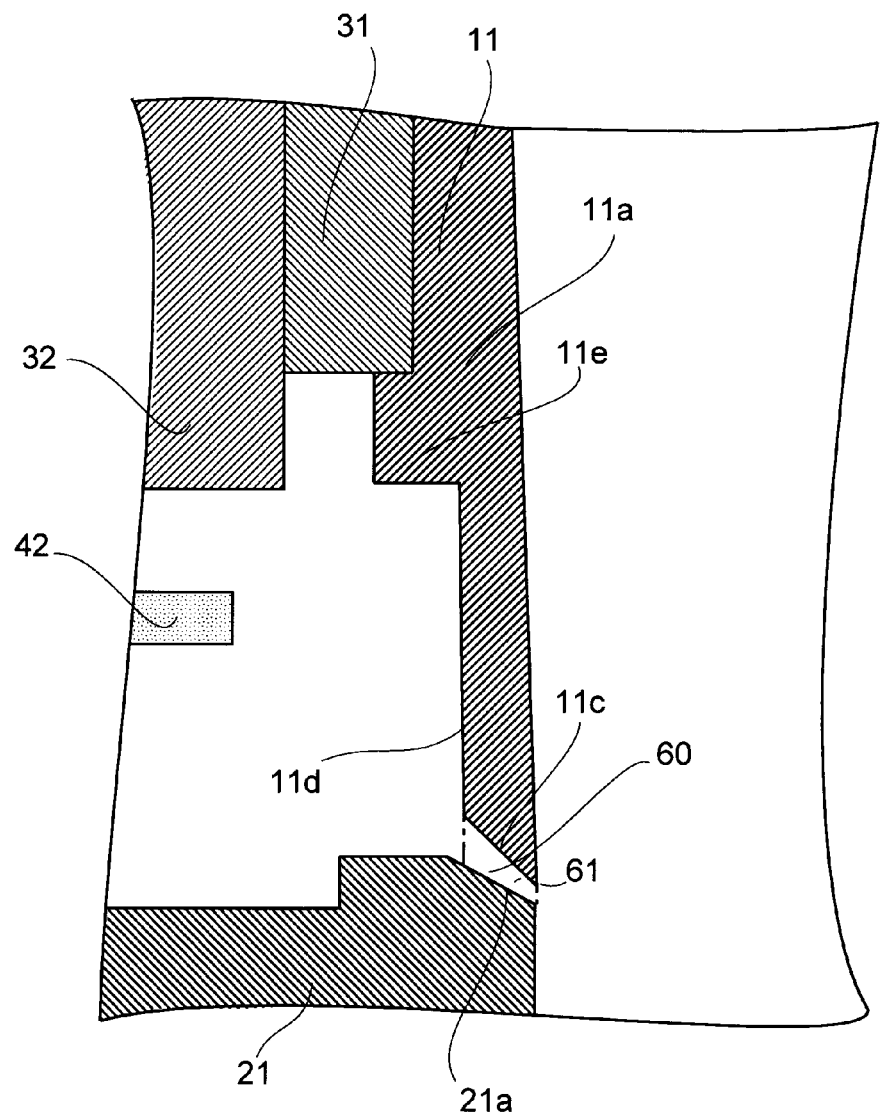
FIG. 8 is a vertical sectional view illustrating a portion of a blower according to a fourth preferred embodiment of the present invention in an enlarged form.

Next, a fourth preferred embodiment of the present invention will now be described below. FIG. 8 is a sectional view illustrating a portion of a base portion 21 of a blower 1 according to a fourth preferred embodiment of the present invention in an enlarged form. For the sake of convenience in description, members or portions that have their equivalents in the above-described first preferred embodiment illustrated in FIGS. 1 to 5 are denoted by the same reference numerals as those of their equivalents in the first preferred embodiment. In the fourth preferred embodiment, the second region 62 is omitted. The fourth preferred embodiment is otherwise similar to the first preferred embodiment.

The base portion 21 does not include the wall portion 23, and accordingly, the base portion 21 and an inner circumferential surface of a cup portion 11 are not radially opposed to each other, and a gap 60 includes no second region 62. The present preferred embodiment is also able to achieve beneficial effects similar to those of the first preferred embodiment.

Fifth Preferred Embodiment

Figure 9:
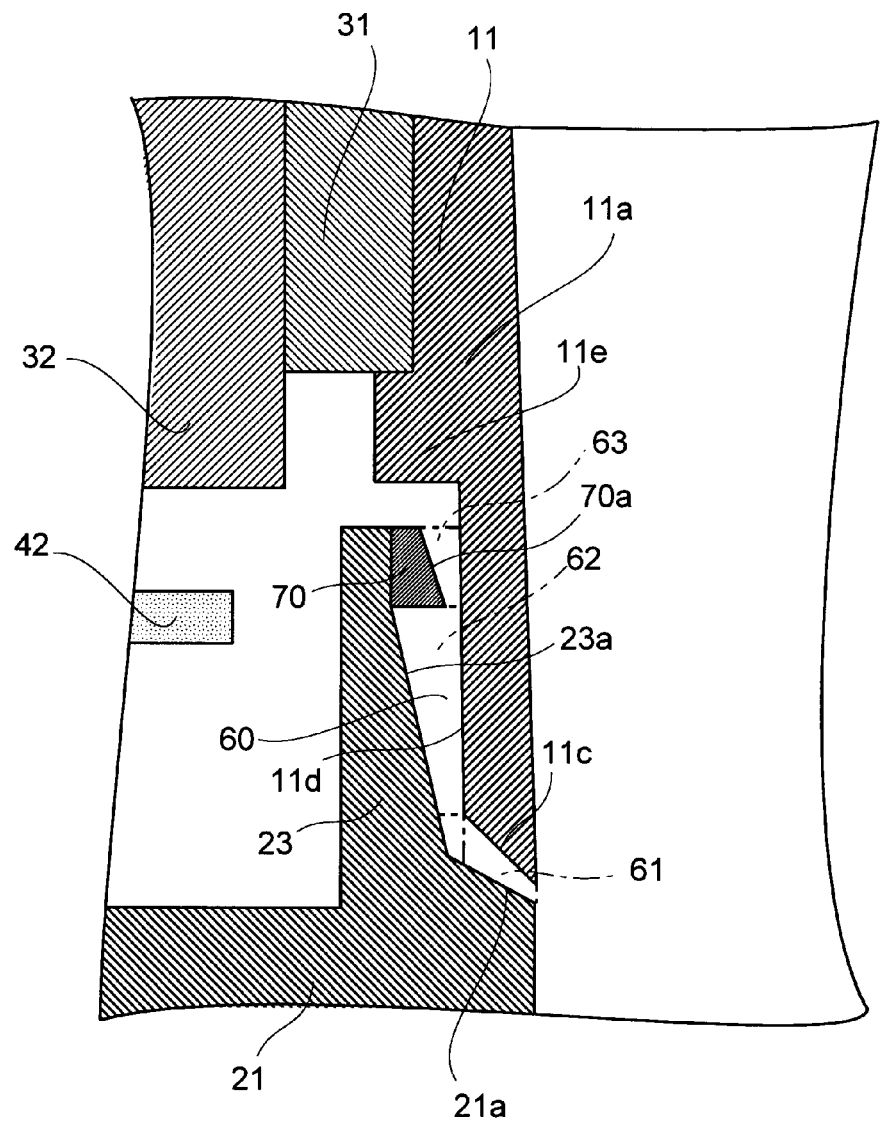
FIG. 9 is a vertical sectional view illustrating a portion of a blower according to a fifth preferred embodiment of the present invention in an enlarged form.

Next, a fifth preferred embodiment of the present invention will now be described below. FIG. 9 is a sectional view illustrating a portion of a base portion 21 of a blower 1 according to a fifth preferred embodiment of the present invention in an enlarged form. For the sake of convenience in description, members or portions that have their equivalents in the above-described first preferred embodiment illustrated in FIGS. 1 to 5 are denoted by the same reference numerals as those of their equivalents in the first preferred embodiment. The fifth preferred embodiment is different from the first preferred embodiment in that an annular seal member 70 defined by an elastic body is arranged in a gap 60. The fifth preferred embodiment is otherwise similar to the first preferred embodiment.

The gap 60 includes a third region 63 arranged above a second region 62 and between radially opposed portions of the base portion 21 and an inner circumferential surface 11d of a cup portion 11. In addition, the seal member 70 defined by the elastic body is arranged on an outer circumferential surface of the base portion 21 in the third region 63. In the present preferred embodiment, the third region 63 is defined between portions of an outer circumferential surface 23a of a wall portion 23 and the inner circumferential surface 11d of a barrel portion 11a above the second region 62. The seal member 70 is arranged on the outer circumferential surface 23a in the third region 63.

The thickness of the seal member 70 reduces the radial width of the gap 60 at a boundary between the third region 63 and the second region 62. This contributes to more effectively preventing moisture and dust from intruding from the second region 62 into the third region 63.

In the third region 63, an outer circumferential surface 70a of the seal member 70 is arranged to slant radially outward in the axially downward direction, and an inclination angle of the outer circumferential surface 70a of the seal member 70 with respect to the axial direction is greater than an inclination angle of the inner circumferential surface 11d with respect to the axial direction. This causes the third region 63 to gradually decrease in radial width in the axially downward direction.

Moisture gathered in the third region 63 flows axially downward due to capillary action. Accordingly, any moisture that has entered into the third region 63 can be easily discharged out of the cup portion 11, leading to an additional improvement in waterproof performance of the blower 1.

In addition, the radial width of the third region 63 gradually increases in the axially upward direction. Accordingly, any moisture that has intruded into the third region 63 will be restrained from flowing axially upward by capillary action. This contributes to more effectively preventing the moisture from intruding from the third region 63 toward a deep interior of the cup portion 11.

In addition, since the seal member 70 is defined by the elastic body, a water pressure acting from the second region 62 toward the third region 63 would easily cause a lower end portion of the seal member 70 to bend toward the inner circumferential surface 11d of the barrel portion 11a. At this time, the radial width of the gap 60 would be further reduced at the boundary between the third region 63 and the second region 62. This contributes to more effectively preventing moisture and dust from intruding from the second region 62 into the third region 63.

Sixth Preferred Embodiment

Figure 10:
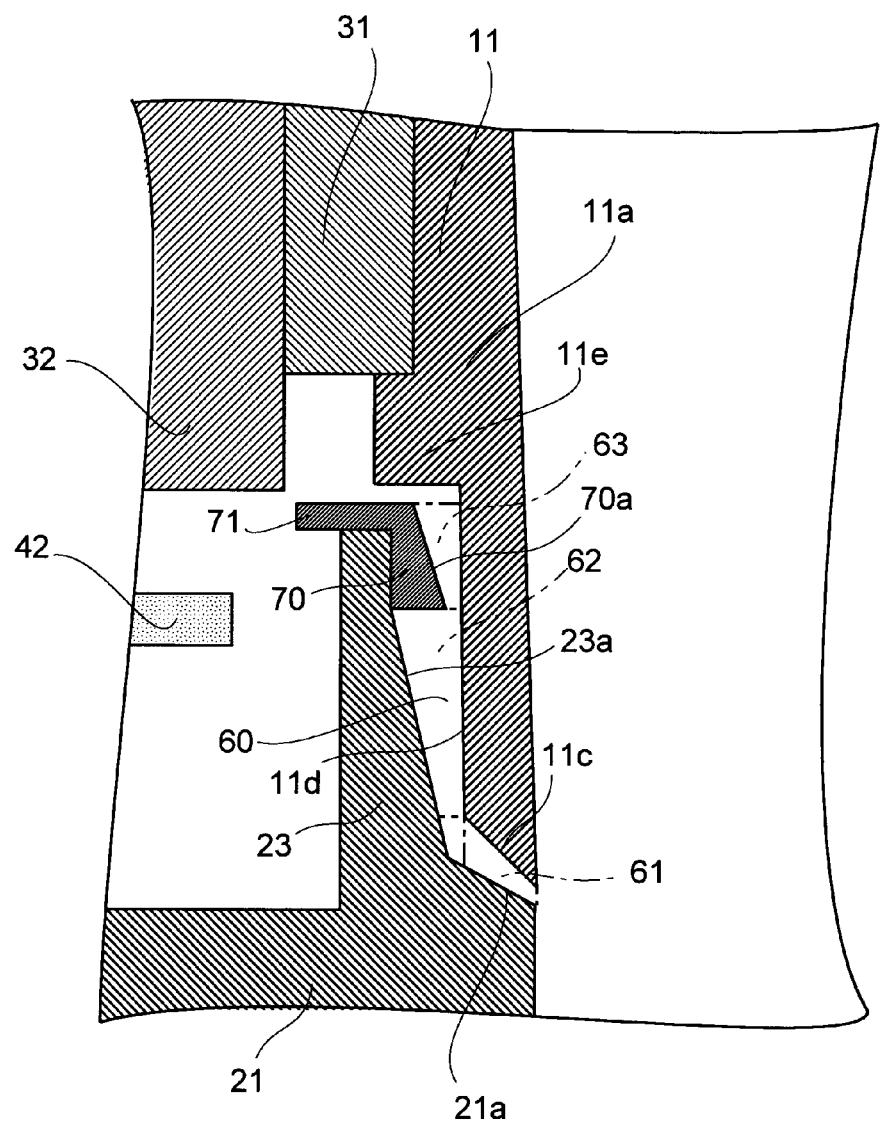
FIG. 10 is a vertical sectional view illustrating a portion of a blower according to a sixth preferred embodiment of the present invention in an enlarged form.

Next, a sixth preferred embodiment of the present invention will now be described below. FIG. 10 is a sectional view illustrating a portion of a base portion 21 of a blower 1 according to a sixth preferred embodiment of the present invention in an enlarged form. For the sake of convenience in description, members or portions that have their equivalents in the above-described fifth preferred embodiment illustrated in FIG. 9 are denoted by the same reference numerals as those of their equivalents in the fifth preferred embodiment. The sixth preferred embodiment is different from the fifth preferred embodiment in the shape of a seal member 70. The sixth preferred embodiment is otherwise similar to the fifth preferred embodiment.

Note that the seal member 70 according to each of the above-described fifth preferred embodiment and the sixth preferred embodiment may be arranged to be water-repellent. This will make it easier to discharge any moisture in the gap 60, and will contribute to more effectively preventing moisture from intruding into the gap 60.

The seal member 70 includes a flange portion 71 arranged to extend radially inward from an upper end of a third region 63. The flange portion 71 is arranged axially opposite to a protruding portion 11e. Provision of the flange portion 71 reduces the axial width of a gap between a lower surface of the protruding portion 11e and the seal member 70. This contributes to more effectively preventing moisture and dust from intruding from the third region 63 toward a deep interior of a cup portion 11.

Seventh Preferred Embodiment

Figure 11:
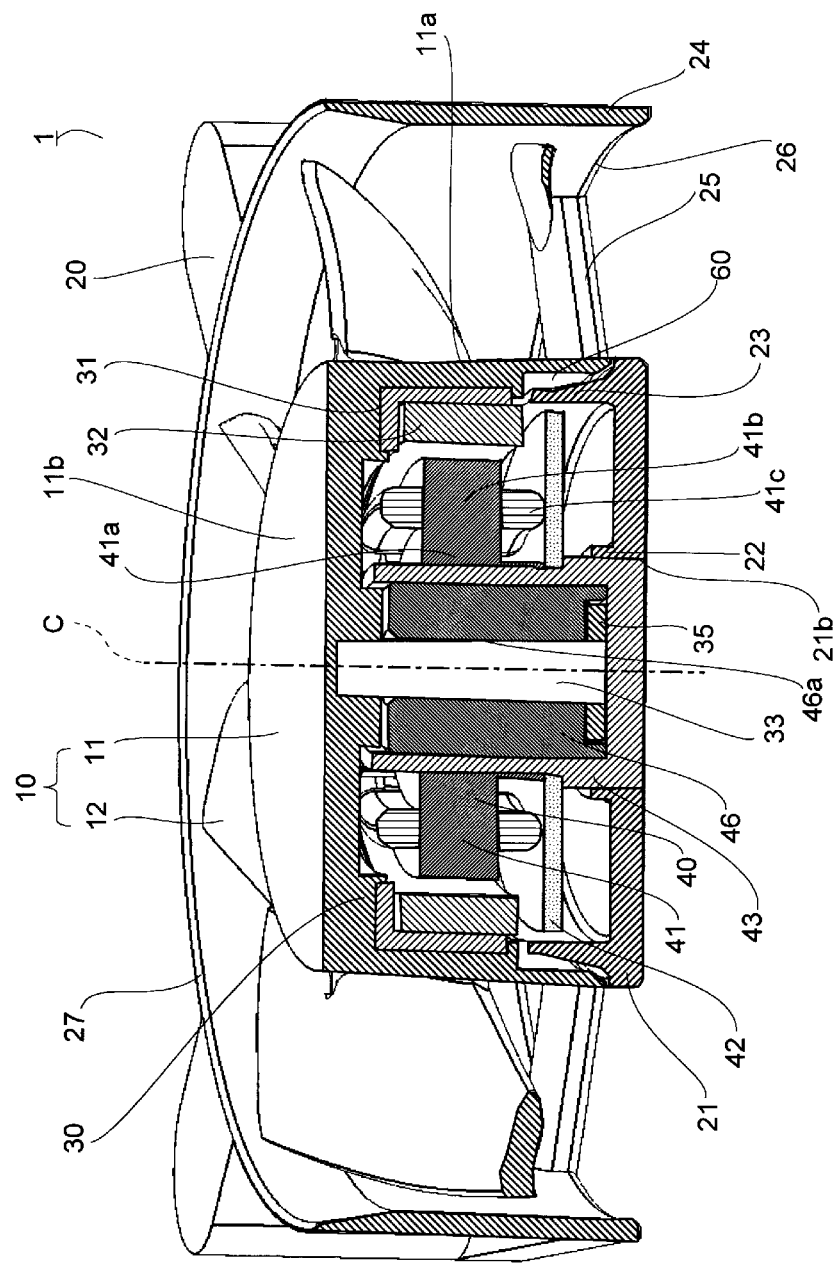
FIG. 11 is a perspective sectional view of a blower according to a seventh preferred embodiment of the present invention.

Next, a seventh preferred embodiment of the present invention will now be described below. FIG. 11 is a perspective sectional view of a blower 1 according to the seventh preferred embodiment. For the sake of convenience in description, members or portions that have their equivalents in the above-described first preferred embodiment illustrated in FIGS. 1 to 5 are denoted by the same reference numerals as those of their equivalents in the first preferred embodiment. In the seventh preferred embodiment, a fluid dynamic bearing is used in place of the air dynamic pressure bearing. The seventh preferred embodiment is otherwise similar to the first preferred embodiment.

A stationary portion 40 includes a stator 41, a circuit board 42, a bearing housing 43, and a sleeve 46. The bearing housing 43 has a bottom and is tubular, and the sleeve 46 is inserted in the bearing housing 43. The sleeve 46 includes a through hole 46a arranged to extend along a central axis C.

A rotating portion 30 includes a rotor holder 31, a first magnet 32, a shaft 33, and a thrust plate 35. The thrust plate 35 is in the shape of a circular ring, and is fixed to a lower end of the shaft 33. The shaft 33 is inserted through the through hole 46a of the sleeve 46.

A minute radial gap is defined between an outer circumferential surface of the shaft 33 and an inner circumferential surface of the sleeve 46. In addition, a minute axial gap is defined between an upper surface of the thrust plate 35 and a lower surface of the sleeve 46. A minute radial gap is defined between an outer circumferential surface of the thrust plate 35 and an inner circumferential surface of the sleeve 46. A minute axial gap is defined between a lower surface of the thrust plate 35 and an inner bottom surface of the bearing housing 43.

The above minute gaps are continuous with one another, and have a lubricating oil arranged therein. A fluid dynamic bearing is thus defined in the minute gaps, and the shaft 33 is rotatably supported through the fluid dynamic bearing. Use of the fluid dynamic bearing makes the flow of air passing inside of an impeller 10 smaller than in the case where the air dynamic pressure bearing is used. Accordingly, the use of the fluid dynamic bearing reduces the likelihood that water condensation will occur inside of the impeller 10. This leads to an additional improvement in waterproof performance of the blower 1. Note that a bearing other than the fluid dynamic bearing and the air dynamic pressure bearing may alternatively be used.

6. Others

It is to be noted that the foregoing description of the preferred embodiments of the present invention is meant to be merely illustrative of the present invention. Features of the preferred embodiments may be modified appropriately without departing from the scope of the technical idea of the present invention. Also note that any possible combination of the preferred embodiments falls within the scope and spirit of the present invention. For example, the seal member 70 according to each of the fifth and sixth preferred embodiments may be arranged in the gap 60 according to the second preferred embodiment or the third preferred embodiment.

Preferred embodiments of the present invention are applicable to, for example, blowers for use in, for example, transportation equipment.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A blower comprising:
an impeller that is rotatable about a central axis extending in an axial direction;
a motor to rotate the impeller; and
a base portion on which the motor is mounted; wherein
the impeller includes:
a cup portion that covers the motor; and
a plurality of blades extending outward from the cup portion in a radial direction perpendicular to the axial direction and arranged in a circumferential direction;
a gap is provided between the cup portion and the base portion such that the gap becomes narrower in an outward direction with increasing distance from an interior of the cup portion;
the gap includes a first region between a lower end surface of the cup portion and a portion of the base portion axially opposed to the lower end surface, all portions of the lower end surface of the cup portion are axially opposed to the base portion, and the first region has a total axial dimension that continuously decreases as the first region extends in a radially outward direction; and
the gap includes a second region between radially opposed portions of the base portion and an inner circumferential surface of the cup portion, and continuously decreases in radial width in an axially downward direction.

2. The blower according to claim 1, wherein the lower end surface of the cup portion slants axially downward in the radially outward direction.

3. The blower according to claim 1, wherein the second region is radially inward of the first region.

4. The blower according to claim 1, further comprising a seal member defined by an elastic body, wherein
the gap includes a third region above the second region and between radially opposed portions of the base portion and the inner circumferential surface of the cup portion; and
the seal member is on an outer circumferential surface of the base portion in the third region.

5. The blower according to claim 4, wherein the third region decreases in radial width in the axially downward direction.

6. The blower according to claim 4, wherein
the seal member includes a flange portion extending radially inward from an upper end of the third region; and
the cup portion includes a protruding portion that protrudes from the inner circumferential surface thereof and is axially opposite to the flange portion.

7. The blower according to claim 1, wherein at least one of a portion of an inner surface of the cup portion and a portion of an upper surface of the base portion which are opposed to each other with the gap therebetween is water-repellent.

8. The blower according to claim 1, wherein each of the cup portion and the base portion is made of a resin.

9. The blower according to claim 1, wherein the motor includes a shaft including an air dynamic pressure bearing, the shaft being fixed to the cup portion; and a minimum axial width of the gap is smaller than a minimum axial width of a gap between a lower end portion of the shaft and a surface axially opposed to the lower end portion of the shaft.

* * * * *